United States Patent [19]

Spinu

[11] Patent Number: 5,225,521
[45] Date of Patent: Jul. 6, 1993

[54] STAR-SHAPED HYDROXYACID POLYMERS

[75] Inventor: Maria Spinu, Wilmington, Del.

[73] Assignee: E. I. Du Pont de Nemours and Company, Wilmington, Del.

[21] Appl. No.: 815,995

[22] Filed: Dec. 31, 1991

[51] Int. Cl.$^5$ .................... C08G 63/08; C08L 67/04
[52] U.S. Cl. .................... 528/354; 525/415; 606/228
[58] Field of Search .................... 525/415; 528/354; 606/228

[56] References Cited

U.S. PATENT DOCUMENTS

| | | | |
|---|---|---|---|
| 4,118,470 | 10/1978 | Casey et al. | 528/354 |
| 4,122,129 | 10/1978 | Casey et al. | 528/272 |
| 4,429,080 | 1/1984 | Casey et al. | 525/415 |
| 4,578,384 | 3/1986 | Hollinger | 424/177 |
| 5,028,667 | 7/1991 | McLain et al. | 525/415 |

OTHER PUBLICATIONS

Saotome, K., Kodatra Y., "Macromol. Chem." vol. 82 pp. 41-52 (1964).
Zhu et al., "Journal of Applied Polymer Science" vol. 39 pp. 1-9 (1990).
Zhu et al., "Journal of Applied Polymer Science" Part A: Polymer Chemistry vol. 27 pp. 2151-2159 (1969).

Primary Examiner—John Kight, III
Assistant Examiner—Shelley A. Dodson
Attorney, Agent, or Firm—Robert B. Stevenson

[57] ABSTRACT

Star-shaped poly (hydroxyacid) chains and the process for preparing them are disclosed. The star shaped polymers have the residue of a central polyfunctional compound having at least 5 hydroxyl or amino groups and 5 to 100 carbon atoms with polymeric arms attached to the functional groups. The polymeric arms are formed from lactide, glycolide or caprolactone. In a preferred aspect the inner segment of the arms are an amorphous copolymer of D-lactide and L-lactide and the outer segment of the arms are a semicrystalline polymer of one of L-lactide or D-lactide.

16 Claims, No Drawings

STAR-SHAPED HYDROXYACID POLYMERS

BACKGROUND OF THE INVENTION

1. Field of the Invention

The present invention relates to star-shaped polymers with a plurality of poly(hydroxyacid) branches or arms attached to a central polyfunctional compound at branching locations that were originally a plurality of hydroxyl or amino groups. More specifically but not by way of limitation, the invention relates to star-shaped polymers having a central sugar or sugar related residue with sequential amorphous polymer blocks followed by semicrystalline homopolymer blocks of polylactide, polyglycolide, polycaprolactone, or the like.

2. Description of the Related Art

Saotome and Kodatra in "Polymerization of delta-Valerolac-tone and Preparation of a Thermostable Derivative from a Polyester", Macromol. Chem., 82 pp. 41-52 (1964) describe the polymerization of delta-valerolactone using initiators which have active hydrogen atoms in their molecule, such as ethylene glycol or ethanol amine. The polymers produced with these initiators have hydroxyl groups at both ends of the polymer chain.

Zhu et al. in "Preparation, Characterization, and Properties of Polylactide (PLA)-Poly (Ethylene Glycol) (PEG) Copolymers: A Potential Drug Carrier", Journal of Applied Polymer Science, Vol 39, pages 1-9 (1990) describe the use of oligomeric and polymeric polyethylene with hydroxyl end groups for polymerization of lactide.

Zhu et al. "Super Microcapsules (SMC). I. Preparation and Characterization of Star Polyethylene Oxide (PEO)-Polylactide (PLA) Copolymers.", Journal of Polymer Science: Part A: Polymer Chemistry, Vol 27, pages 2151-2159 (1989) describe polymerization of lactide from 3-arm and 4-arm hydrophilic poly (ethylene oxide) with hydroxylterminated arms.

SUMMARY OF THE INVENTION

The present invention provides star-shaped polymers which comprise a central residue derived from a polyfunctional compound having from 5 to 100 carbon atoms and originally having at least 5 amino or hydroxyl groups and a plurality of polymeric branches or arms with a number average molecular weight of 1,000 to 100,000 attached to the amino or hydroxyl group branching locations wherein the polymeric arms are formed of polylactide, polyglycolide, polycaprolactone or mixtures thereof. In one particular embodiment of the present invention, the polyhydoxyacid branches or arms of the star-shape polymer comprise sequentially ordered blocks of amorphous polylactide (copolymer) attached to a central sugar or inositol residue followed by a semicrystalline block of essentially pure poly(L-lactide) or poly(D-lactide) (homopolymer) graphed to the amorphous block. In this manner the, melting point of the resulting polymer can be lowered thus improving the acceptable temperature range for fabrication purposes while preserving the physical properties associated with the presence of significant crystallinity.

DESCRIPTION OF THE PREFERRED EMBODIMENTS

The present invention relates to star-shaped polymers wherein lactide is polymerized onto a polyfunctional hydroxyl or amino containing compound. The polyfunctional compound generally contains at least 5 hydroxyl or amino groups, and from 5 to 100 carbon atoms. While sugars, such as monosaccharide or disaccharide hexoses or pentoses can be used, it is preferred to use a polyfunctional compound in which all of the functional groups are substantially of the same reactivity, i.e., either all primary or all secondary. Thus an especially preferred polyfunctional compound is inositol:

having six, essentially equivalent, -OH groups.

The pendant polylactide groups forming the arms (i.e., the polymer branches) of the star-shaped polymer can be copolymers of L-lactide and D-lactide or a homopolymer of greater than 98% L-lactide or greater than 98% D-lactide. The copolymers of 10-90% L-lactide and 90-10% D-lactide, and preferably 15-85% L-lactide and 85-15% D-lactide, provide amorphous polymer blocks. The homopolymers containing only one of greater than 98% L-lactide or greater than 98% D-lactide provide polymer blocks having a crystallinity of about 37%. These semicrystalline polylactide homopolymers generally melt above 173° C. and lactide begins to degrade thermally at about 180° C. For this reason it is preferred to form a portion of the arms with amorphous polylactide and a portion of the arms with semicrystalline polyactide. This drops the melting point by 10° to 20° C., depending on the length of the semicrystalline blocks, while still retaining the superior physical characteristics of the semicrystalline homopolylactide. While either the amorphous or semicrystalline block can form the inner arm segment and the other type of block the outer arm segment, it is preferred that the inner arm segments adjacent the polyfunctional compound be amorphous and that the outer arm segments be semicrystalline. The individual inner arm segments generally will have a molecular weight of 1,000 to 50,000 and the outer arm segments a molecular weight of 1,000 to 50,000. The total molecular weight of the individual arms generally will be from 2,000 to 100,000.

Polycaprolactone or polyglycolide, alone or a copolymer of L,D or both lactides may be used to form the arms or preferably the inner arm segments.

The polymerization can be done either in bulk or in solution. Preferred solvents are toluene and the xylenes, for high temperature reactions and methylene chloride or chloroforms for low temperature reactions. Suitable reaction temperatures for solution polymerization range from −100° to 300° C. with −40° to 110° C. being the preferred range. The preferred temperature for the bulk polymerization is 120° to 170° C. Any catalyst for ring opening of lactide, glycolide or caprolactone may be used for the polymerization step(s). Generally stannous 2-ethylhexanoate (tin octanoate) is used for the polymerization, but other catalysts such as the yttrium or lanthanide series rare earth metal catalysts disclosed in U.S. Pat. No. 5,028,687 can be used for the polymerization step(s). The polymerization reaction generally takes from 5 minutes to 72 hours depending on the temperature used and the amount of catalyst present. Generally the molar ratio of monomer/catalyst is from 200/1 to 10,000/1. In the preferred aspect of the invention the mixture of L- and D-lactide is polymerized onto the polyfunctional compound until the monomer conversion is greater than 95% and further addition of the L-lactide or D-lactide is made, generally along with additional catalyst.

The polymers of the present invention are biodegradable and find use as general purpose molding resins. Because of their biodegradability the polymers are particularly useful in packaging applications.

Each of the arms of the star polymers produced by the present invention are terminated with an hydroxyl group. Therefore, the star is a multifunctional polymer which can be reacted with a difunctional linker to generate a three dimensional network of insoluble thermoset polymer. Suitable difunctional are aryl diacyl chlorides or aryl diisocyanates containing 8 to 20 carbon atoms, such as terephthaloyl chloride or toluene diisocyanate.

EXAMPLE 1

Preparation of macroinitiator

In a dry box, L-lactide (8.2 g, 56.94 mmol), D-lactide (1.40 g, 9.722 mmol), and inositol (0.40 g, 2.22 mmol) are weighed in an oven dried 100 ml one-necked round bottom flask equipped with a magnetic stirring bar. After charging the reactants, the reaction flask is fitted with a rubber septum secured in place with copper wire, and transferred into a hood. The reaction flask, maintained under a positive pressure of nitrogen at all times, is heated to 150° C. and reacted, without catalyst, to initiate ring opening lactide by inositol OH groups. The initial reaction mixture is heterogenous, as inositol (mp=224°-225° C.) is not readily soluble in melted lactide. However, after a few hours at 150° C., the reaction becomes homogeneous and slightly viscous, as lactide units are polymerized off the OH groups of inositol initiator. The reaction is allowed to proceed for 12 hours before catalyst addition. 0.33 ml tin (SnOct) octanoate solution, 0.1M in toluene, (Monomer/-Catalyst (i.e.,M/Cat.)= 2000/1)is then added and the reaction is allowed to proceed for additional 6 hours at 150° C. to complete lactide polymerization. The armlength of macroinitiator is determined by the molar ratio of monomer/OH groups and it is approximately 720 g/mole (or 5 lactide units) for the example described above. The final reaction mixture is dissolved in $CH_2Cl_2$, precipitated from hexane/methanol, 50/50 v/v, and dried in a vacuum oven at room temperature for 72 hours prior to use.

Characterization

Theoretical number average molecular weight, $M_n$=4,320 (calculated from the molar ration of Lactide/OH groups); Experimental, $M_n$=5980 g/mole (Titration, OH#); Gel permeation chromatography (GPC), $M_n$=7,350 g/mole; Weight average molecular weight, $M_w$=8890 g/mole; and $M_w/M_n$=1.21 (using linear polystyrene standard, PS STD); Glass Transition Temperature, $T_g$=36° C. (as determined by diffential scanning calorimetry, DSC); No $T_m$ (amorphous material);

EXAMPLE 2

Synthesis of amorphous 6-arm polylactide star

In a dry box, 15.4 g (106.94 mmoles) L-lactide, 3.8 g (26.389 mmoles) D-lactide, and 0.30 g (0.050 mmoles) hexafunctional hydroxyl containing macroinitiator from Example 1 $M_n$ 5,980) are weighed into an oven dried 100 ml. 3-necked round bottom flask equipped with overhead stirrer. The reaction flask is then transferred in a hood, placed under an inert atmosphere, and heated to 150° C., until the reaction mixture forms a homogeneous melt. 0.7 ml SnOct solution 0.1M in toluene is added (M/Cat.)=2000/1 molar ratio) and the reaction is allowed to proceed for 1 hour at 150° C. A viscous homogeneous melt is formed shortly after catalyst addition, and the viscosity increases with reaction time; however, stirring is possible throughout the reaction. The final reaction mixture is cooled to room temperature and dissolved in 200 ml $CH_2Cl_2$. The polymer is isolated by precipitation from hexane, and dried in a vacuum oven at room temperature for 24 hours.

Characterization

Mp=223,000 (GPC, linear PS STD); $T_g$=56° C. (DSC); no $T_m$ (amorphous polymer).

EXAMPLE 3

Synthesis of polylactide 6-arm star with amorphous/semicrystalline block structure In a dry box, 4.8 g (33.333 mmoles L-lactide, 1.6 g (11.111 mmoles) D-lactide, and 0.30 g (0.050 mmoles) hexafunctional hydroxy containing macroinitiator from Example 1 ($M_n$ 5,980) are weighed into an oven dried 100 ml. 3-necked round bottom flask equipped with overhead stirrer. The reaction flask is then transferred in a hood, placed under an inert atmosphere, and heated to 150° C. without catalyst until the reaction mixture forms a homogeneous melt. When the reaction mixture becomes homogeneous, 0.25 ml SnOct solution 0.1M in toluene is added (M/Cat.=2000/1 molar ratio) and the reaction is allowed to proceed for 1 hour at 150° C., at which time the conversion of lactide is greater than 95%. A viscous homogeneous melt is formed shortly after catalyst addition, and the viscosity increases with reaction time. After 1 hour, a second monomer portion consisting of 12.8 g (88.888 mmoles) L-lactide is added and allowed to dissolve in the previous reaction mixture, under inert atmosphere. When the reaction mixture becomes homogeneous again, a second catalyst portion (0.5 ml SnOct 0.1M in toluene) is added, and the polymerization is allowed to proceed for 30 more minutes. Shortly after second catalyst addition the reaction viscosity increases considerably and the stirring becomes difficult. The final reaction mixture is cooled to room temperature and dissolved in 200 ml $CH_2Cl_2$. The polymer is isolated by precipitation from hexane, and dried in a vacuum oven at room temperature for 24 hours.

Characterization $M_p$=218,000 (GPC, linear PS STD); $T_g$=56° C. (DSC); $T_m$=165° C.

EXAMPLE 4

Synthesis of fully semicrystalline 6-arm L-Polylactide Star

In a dry box, 19.2 (133.33 mmoles) L-lactide, and 0.30 g (0.050 mmoles) hexafunctional hydroxyl containing macroinitiator from Example 1 ($M_n$ 5,980) are weighed into an oven dried 100 ml. 3-necked round bottom flask equipped with overhead stirrer. The reaction flask is then transferred in a hood, placed under an inert atmosphere, and heated to 150° C., until the reaction mixture forms a homogeneous melt. 0.7 ml SnOct solution 0.1M in toluene is added (M/Cat.=2000/1 molar ratio) and the reaction is allowed to proceed at 150° C. A viscous homogeneous melt is formed shortly after catalyst addition, and the viscosity increases with reaction time. Approximately 10 minutes after catalyst addition the reaction can no longer be stirred and the polymerization is allowed to continue in the "solid state", without stirring, for 20 more minutes. The final reaction mixture is cooled to room temperature and dissolved in 200 ml CH$_2$Cl$_2$ using heat to ensure complete solution. The polymer is isolated by precipitation from hexane, and dried in a vacuum oven at room temperature for 24 hours.

Polymer properties

Mp=278,000 (GPC, linear PS STD); T$_g$=56° C. (DSC); T$_m$=173° C.

EXAMPLE 5

Synthesis of amorphous/semicrystalline 5-arm L/D polylactide star

In a dry box L-lactide (6.20 g, 0.0430 mole, D-lactide (2.10 g, 0.0140 mole), and alpha-D-glucose (0.03 g, 0.000166 mole) are weighed into an oven dried 100 ml, 3-necked round bottom flask equipped with overhead stirrer. The reaction flask is then transferred in a hood, placed under an inert atmosphere and heated to 150° C. without catalyst until the reaction mixture forms a homogeneous melt. When the reaction mixture becomes homogeneous 0.29 ml of 0.1M tin octanoate is added (M/cat.-2000/1 molar ratio) and the reaction is allowed to proceed for 1 hour at 150° C. A viscous homogeneous melt is formed shortly after catalyst addition, and the viscosity increases with reaction time. After 1 hour, a second monomer consisting of 25 g (0.1736 mole) L-lactide is added and allowed to dissolve in the previous reaction mixture, under inert atmosphere. After all additional monomer is dissolved and the reaction mixture becomes homogeneous again, a second catalyst portion (0.9 ml tin octanoate 0.1M in toluene) is added, and the polymerization is allowed to proceed for 30 more minutes. Approximately 10 minutes after catalyst addition the reaction mixture can no longer be stirred and the polymerization is allowed to continue in the "solid state", without stirring, for 20 minutes. The final reaction mixture is cooled to room temperature and dissolved in 200 ml CH$_2$Cl$_2$ using heat to ensure complete solution. The polymer is isolated by precipitation from hexane, and dried in a vacuum at room temperature for 24 hours. The overall L-lactide/D-lactide ratio of the polymer is 93.7/6.3. the overall amorphous/semicrystalline content of the polymer is 25%/75%. The theoretical number average molecular weight of the amorphous segment of each arm is 10,000. The theoretical number average molecular weight of the semicrystalline segment of each arm is 30,000. The theoretical number average molecular weight of each arm is 40,000 and the total number average theoretical weight of the 5 arm polymer is 200,000. The polymer has a glass transition temperature of 54° C. and a melting point of 162° C.

Example 5 is repeated but varying the ratio of amorphous to semicrystalline segments in the five arms of the polymer.

A polymer having an amorphous to semicrystalline ratio in each arm of 33.3%/66.6% wherein the amorphous segment had a theoretical number average molecular weight of 15,000, a theoretical total arm number average molecular weight of 45,000 and a total theoretical polymer number average molecular weight of 225,000 was found experimentally to have a Mp of 273,000, a glass transition temperature of 56° C. and a melting point of 160° C.

A polymer having an amorphous to semicrystalline ratio in each arm of 37.56/62.5% wherein the amorphous segment had a theoretical number average molecular weight of 15,000, the semicrystalline segment had a theoretical number average molecular weight of 25,000 to provide a theoretical total arm number average molecular weight of 40,000 and a total theoretical polymer number average molecular weight of 200,000 was found experimentally to have a Mp of 201,000, a glass transition temperature of 56° C. and a melting point of 160° C.

Having thus described and exemplified the invention with a certain degree of particularity, it should be appreciated that the following claims are not to be so limited but are to be afforded a scope commensurate with the wording of each element of the claim and equivalents thereof.

I claim:

1. A star-shaped polymer comprising:
   (a) a central residue derived from a polyfunctional compound having from 5 to 100 carbon atoms and originally having at least 5 amino or hydroxyl groups; and
   (b) a plurality of polymeric arms with a number average molecular weight of 1,000 to 100,000 attached to the amino or hydroxyl group locations wherein said polymeric arms are formed of one or more amorphous blocks of polylactide, polyglycolide, polycaprolactone or mixtures thereof, and one or more semicrystalline blocks of polymer of 98-100% L-lactide or 98-100% D-lactide.

2. The polymer of claim 1 wherein the arms comprise polylactide.

3. The polymer of claim 2 wherein the arms consist essentially of poly L-lactide and poly D-lactide.

4. The polymer of claim 1 wherein the central residue of a polyfunctional compound is a residue of a sugar or inositol.

5. The polymer of claim 4 wherein the central residue of a polyfunctional compound is the residue of inositol.

6. The polymer of claim 1 wherein the branches are formed of amorphous segments adjacent the central polyfunctional compound residue and semicrystalline segments.

7. The polymer of claim 6 wherein the amorphous segments are copolymers of 90 to 10 percent D-lactide and 10 to 90 percent L-lactide, and the semicrystalline segment are a polymer of 98-100% L-lactide or 98-100% D-lactide.

8. The polymer of claim 7 wherein the amorphous segments have number average molecular weights of 1,000 to 50,000 and the semicrystalline segments have molecular weights of 1,000 to 50,000.

9. The polymer of claim 8 wherein the central residue of a polyfunctional compound is a residue of a sugar or inositol.

10. The polymer of claim 9 wherein the central residue of a polyfunctional compound is the residue of inositol.

11. A process comprising polymerizing lactide, glycolide or caprolactone onto a polyfunctional compound having at least 5 amino or hydroxyl groups of substantially the same reactivity and having 5 to 100 carbon atoms and then polymerizing 98-100% L-lactide or 98-100% D-lactide onto the resulting polymer chains of lactide, glycolide or caprolactone to form semicrystalline segments.

12. The process of claim 11 wherein lactide is polymerized onto the polyfunctional compound.

13. The process of claim 12 wherein a mixture of 10 to 90 percent L-lactide and 90 to 10 percent D-lactide is first polymerized onto the polyfunctional compound to form amorphous segments.

14. The process of claim 13 wherein the mixture of L-lactide and D-lactide is polymerized to produce amorphous segments having number average molecular weights of from 1,000 to 50,000 and semicrystalline segments having number average molecular weights of from 1,000 to 50,000.

15. The process of claim 14 wherein the polyfunctional compound is a sugar or inositol.

16. The process of claim 15 wherein the polyfunctional compound in inositol.

* * * * *